Sept. 14, 1943.                    J. CRANE                    2,329,595
                        DRY SHAVING OR CLIPPING MACHINE
                    Filed March 29, 1938        2 Sheets-Sheet 1
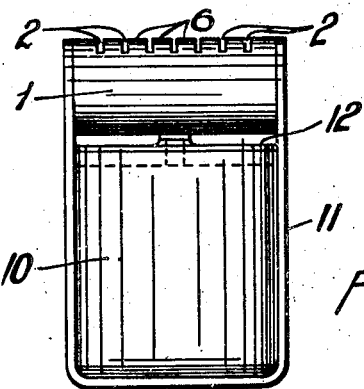
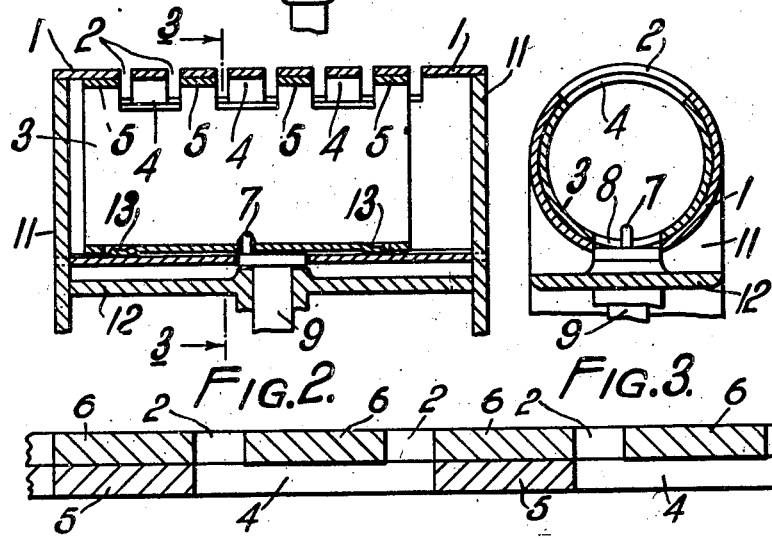

Sept. 14, 1943. J. CRANE 2,329,595
DRY SHAVING OR CLIPPING MACHINE
Filed March 29, 1938 2 Sheets-Sheet 2
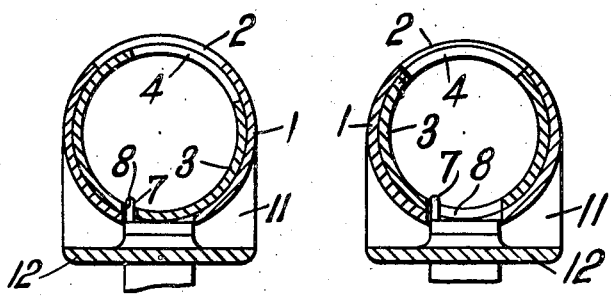
FIG. 5.   FIG. 6.
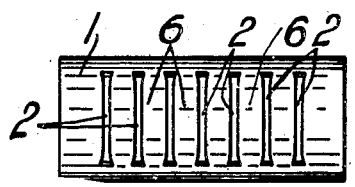   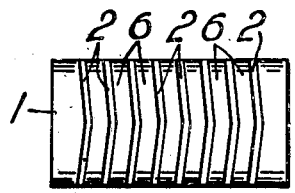
FIG. 8.   FIG. 10.
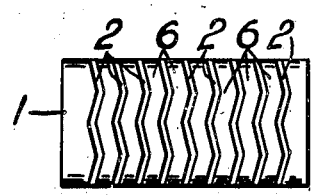   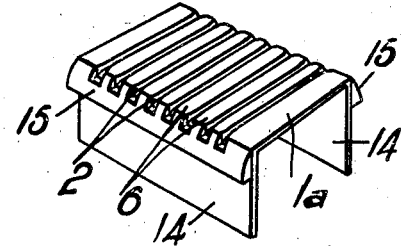
FIG. 11.   FIG. 12.
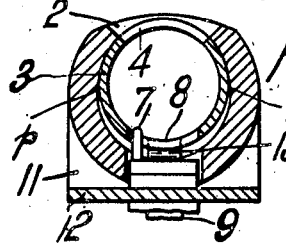   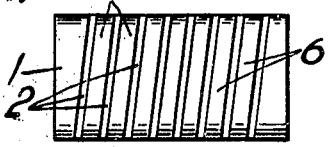
FIG. 7.   FIG. 9.

Patented Sept. 14, 1943

2,329,595

UNITED STATES PATENT OFFICE 2,329,595

DRY SHAVING OR CLIPPING MACHINE

Joshua Crane, Boston, Mass.

Application March 29, 1938, Serial No. 198,771
In Great Britain March 31, 1937

2 Claims. (Cl. 30—43)

This invention relates to shaving or clipping machines adapted to operate without lather or cream and refers more particularly to that kind of such machines which comprise a shearing plate and a cutting plate each having a number of slots therein, the shearing plate being adapted to be held against the skin to be shaved and the cutting plate being adapted to be reciprocated close to the shearing plate in a sense transversely of the slots.

The object of the invention is the provision of an improved device of this character in which there will be more room for the hairs to enter the cutting slots and a minimum of danger of the cut ends of the hairs clogging in the cutting slots, and which will be cheap to make and comfortable and efficient in use.

The invention consists broadly in the arrangement that the cutting slots are wider than the blades between the shearing slots and at the same time the maximum width of the openings through which the hairs are admitted is not too great for safety to the skin, not more than, say .012 of an inch.

In order that the invention may be the more clearly understood a number of modifications of a shaving machine in accordance therewith will now be described, reference being made to the accompanying drawings wherein:

Figure 1 is a side elevation of said shaving machine.

Figure 2 is a sectional side elevation, to an enlarged scale, of the shaving parts proper of the same.

Figure 3 is a cross section on the line 3—3 of Figure 2.

Figure 4 is an enlargement of a portion of Figure 2.

Figure 5 is a similar view to Figure 3 showing a modified form of drive for the cutting element.

Figure 6 is a similar view to Figure 2 illustrating a further modification.

Figure 7 is a similar view to Figure 2 showing a still further modification.

Figure 8 is a plan of the device illustrating a modification to the shearing slots.

Figures 9 and 10 and 11 are similar views to Figure 8 illustrating further modifications to the shearing slots.

Figure 12 is a perspective view of a part of a modified arrangement in which the shearing and cutting plates are flat instead of circular.

Referring to Figures 1 to 4, the shearing plate 1 takes the form of an outer tubular element with a number of equally spaced part circumferential slots 2 in it, and the cutting plate 3 of an inner tubular element also with a number of equally spaced part circumferential slots 4 in it, the inner element 3 being adapted to oscillate longitudinally within the outer element 1 and the shearing and cutting edges being constituted by sides of the slots 2 and 4 in the outer and inner elements respectively, hereinafter termed the shearing and cutting slots.

The number of cutting slots 4 is half that of the shearing slots 2 and the width of the cutting blades 5 or the bars between the cuttings slots is the same as that of the shearing blades 6 or the bars between the shearing slots. It will thus be seen that each cutting slot 4 has a width equal to twice that of a shearing slot 2 plus that of a shearing blade 6.

The stroke of the inner element 3 may vary. In the arrangement illustrated in Figure 2 each cutting blade 5 moves between extreme positions at which it respectively coincides with adjacent shearing blades 6. In Figure 2 the inner element 3 is shown at its left hand extreme position.

Alternatively the stroke of the inner element 3 may extend on both sides of a mid position at which the cutting blades 5 coincide with alternate shearing blades 6 and may be so long either that the two edges of each cutting blade 5 respectively reach the near edge of the adjacent shearing blades 6 or that the two edges of each cutting blade respectively reach the near edge of the next but one shearing blades. If preferred however, any other suitable stroke may be employed.

In this embodiment of the invention the width of the shearing slots 2 may suitably be .008" and the thickness of the shearing blades 6 .005" though this may be as low as .003". These dimensions enable the shave to be sufficiently close while ensuring that the skin will not be cut. The width of the shearing and cutting blades 6 and 5 may be .022" in which case the width of the cutting slots will be .038".

If desired, the number of cutting blades 5, instead of being half that of the shearing blades 6, may be one third or even one fourth. This, by widening the cutting slots further decreases the likelihood of clogging but it also diminishes the number of cutting edges and necessitates an increase in stroke in the case in which all of the shearing edges are to be employed.

In any arrangement coming within the purview of the invention, a suitable overall dimension is ⅜" diameter and 1¼" length for the outer element.

In operation the slotted part of the outer element 1 is pressed against the skin to be shaved and said outer element is slid crossways, that is parallel with the slots, and the hairs, being forced through the slots, will be cut off by the reciprocating inner element 3. The outer element, being of tubular shape, may be made quite thin without the slotted portion thereof being unduly weak, and the shearing blades 6 are able to support themselves when not supported by the cutting blades 5.

The length of the shearing slots 2 may conveniently be such as to subtend an angle of about one right angle at the axis, and the length of the cutting slots 4 may be the same or may be slightly greater so as to ensure that the cutting edges will cover the whole length of the shearing edges. The reciprocation of the inner element 3 is effected by means of a suitable crank element 7 operating in a transverse slot 8 in said inner element at a point say diametrically opposite to the centres of the cutting slots 4 and mounted eccentrically on the end of a rotatable shaft 9 rotated by means of an electric motor 10.

In construction, as shown in Figure 1 the motor 10 and outer element 1 are rigidly supported in a common U shaped frame 11, and a cross member 12 is provided extending between the arms of the U shaped member for supporting the shaft 9. The outer element 1 is provided with an opening for giving access to the crank element 7 and the upper end of the shaft 9.

The construction may be modified in a variety of ways. For example, Figure 5 illustrates an arrangement in which the cutting element 3 is given a slanting movement which is rotary as well as axial. This is done by fitting the rotating crank 7 into a hole, instead of a slot, in the cutting element 3.

Alternatively, this may be done by driving said cutting element by means of a rotating crank pin engaging in a slanting slot therein and at the same time guiding the movement of said cutting element by means of a second slanting slot therein engaged by a fixed pin.

Again, Figure 6 shows a modification in which the thickness of the outer element 1 varies, being a minimum—say .003 inch—at the region of the line of centres of the slots 2 and increasing in both directions from that region. This has the advantage that the strength of the shearing blades 6 is greatly increased, and also that, when the growth to be shaved is comparatively coarse it can first be clipped by using the thicker part of the outer element towards the ends of the slots, and can finally be cut short by using the thinner part of said outer element at the centre of the slots, this being a less painful process and less calculated to clog the machine than if the coarser growth is cut short in the first instance. Also the varying angle at which the outer element 1 may be held to the skin will determine the closeness of the final shave.

The arrangement shown in Figure 7, is a further modification in which the inner diameter of the outer element 1 is made larger than the outer diameter of the inner element 3 but the inner surface of said outer element is recessed between the points p, p so as exactly to fit say, one half of the inner element as shown. Thus the inner and outer elements fit accurately over a region including their slots but over the remaining region a considerable clearance exists between them. This clearance affords ample room for rather more extended springs 13 to be described hereinafter than heretofore, and the construction at the same time serves to reduce friction and facilitates accuracy.

In Figure 7 also the outer element 1 is shown very much thicker than the inner element 3 except over the slotted region where it is thinned by having its outer surface ground down to the part surface of a cylinder of larger diameter. Thus somewhat as in Figure 6 the thickness of the outer element is a minimum at the region of the line of centres of the slots 2 and increases in both directions from that region. In this arrangement as in Figure 6 the minimum thickness of the shearing slots may suitably be .003.

It will be appreciated that in the arrangement of Figures 6 and 7 the inner element may be given a slanting movement as in Figure 5.

Moreover in addition to the circumferential slots 2 and 4, a longitudinal slot may be provided in both elements 1 and 3, bisecting said circumferential slots. This has the advantage of increasing the effective amount of cutting edge since, when the inner element is given a slanting movement the divided ends of the blades of the two elements formed by these longitudinal slots also act as shearing and cutting edges.

The arrangements described may be modified in a number of additional respects. For example the shearing and/or cutting blades, instead of being of rectangular section may be bevelled on their outer surfaces—that is, the surfaces remote from each other—or may have their outer surfaces rounded. Moreover as shown in Figure 8 the shearing slots 2 may have their edges slightly out of the parallel and may be divergent towards their ends to enable the hairs to enter more easily. Again as in Figure 9, each shearing slot may be inclined to the plane at right angles to the axis, or, as shown in Figure 10, it may be inclined in opposite directions from its mid point, or its inclination may vary according to a curve or, as shown in Figure 11, may vary in zig-zag fashion. The edges of the cutting blades will, in all these cases, correspond to those of the shearing blades.

In all of the embodiments heretofore described, springs to hold the cutting blades 5 in close contact with the shearing blades 6 may be formed by longitudinally slotting the ends of the inner element at points opposite to the mid point of the blades so as to form tongues 13 (Figure 2), and bending said tongues outwardly so that they press against the outer element 1.

The inner surface of said outer element is longitudinally grooved to receive these tongues 13, except in the case of Figure 5, and in this way the inner element is maintained in its correct angular relationship to the outer element and is guided to move only longitudinally.

The shearing and cutting cylinders 1 and 3 may, if desired, each be made from a plate, the slots being stamped out while the plate is flat, and the plate being subsequently rolled into cylindrical form.

Instead of being cylindrical, the cutting and shearing plates 3 and 1, may, in the case when no rotary movement is required, be curved, polygonal or flat. Figure 12 illustrates a flat shearing plate 1a supported at its two sides by integral side pieces 14 bent at right angles and the shearing slots extend completely across the flat plate from side to side. To make the shave more comfortable, the open ends of the shearing slots may be closed by means of bars or plates 15 laid against the integral side pieces 14 and rounded as shown so as to slide comfortably and easily on the skin. In this case the ends of the shearing slots will be divergent as shown so as more easily to admit the hairs. Alternatively the shearing slots may not extend so far as the integral side pieces 14 and may be both divergent and bevelled to admit the hairs.

With this arrangement the cutting plate will correspond in shape to the shearing plate being formed with integral side pieces which lie against the side pieces 14.

What I claim and desire to secure by Letters Patent is:

1. A shaving machine comprising a shearing plate having a number of slots therein such that the bars between said slots are supported at both ends, a cutting plate also having a number of slots therein, the pitch of the slots of the cutting plate being greater than that of the slots of the shearing plate and the bars between the shearing slots being of the same width as those between the cutting slots, means for supporting said cutting plate in juxtaposition to said shearing plate and for reciprocating said cutting plate in a sense transversely of the slots, and the amplitude of the reciprocation being such that all the edges of the slots in the shearing plate are effective in the performance of the shaving operation.

2. A shaving machine comprising an outer tubular element having a number of transverse slots therein, an inner tubular element also having a number of transverse slots therein, means for reciprocating said inner tubular element within said outer tubular element in a sense transversely to the slots, leaf spring means bent out of the metal of one of said elements on the side thereof opposite to the slots, and the other of said tubular elements having a longitudinal groove in an unslotted portion thereof to receive the leaf spring aforesaid for both guiding the inner element and urging the slotted portions of the two elements together.

JOSHUA CRANE.

CERTIFICATE OF CORRECTION.

Patent No. 2,329,595.                                                September 14, 1943.

JOSHUA CRANE.

It is hereby certified that error appears in the above numbered patent requiring correction as follows: In the drawings, Sheet 1, the last figure appearing thereon should be designated as --Fig. 4--; and that the said Letters Patent should be read with this correction therein that the same may conform to the record of the case in the Patent Office.

Signed and sealed this 26th day of October, A. D. 1943.

(Seal)

Henry Van Arsdale,
Acting Commissioner of Patents.